(12) United States Patent
Shuman et al.

(10) Patent No.: US 8,982,885 B2
(45) Date of Patent: Mar. 17, 2015

(54) USING FM/AM RADIO AND CELLULAR TECHNOLOGY TO SUPPORT INTERACTIVE GROUP COMMUNICATION FOR LARGE NUMBER OF USERS

(71) Applicant: QUALCOMM Incorporated, San Diego, CA (US)

(72) Inventors: Mohammed Ataur R. Shuman, San Diego, CA (US); Amit Goel, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 13/658,560

(22) Filed: Oct. 23, 2012

(65) Prior Publication Data

US 2014/0112167 A1 Apr. 24, 2014

(51) Int. Cl.
*H04L 12/28* (2006.01)
*H04L 12/18* (2006.01)
(52) U.S. Cl.
CPC .................................. *H04L 12/1845* (2013.01)
USPC .......................................................... 370/390
(58) Field of Classification Search
USPC ................. 370/310, 312, 328–339, 390, 432; 455/517–519
See application file for complete search history.

(56) References Cited

U.S. PATENT DOCUMENTS

| | | | |
|---|---|---|---|
| 5,179,588 A | 1/1993 | Nowicki | |
| 6,625,464 B1 | 9/2003 | Bandy et al. | |
| 2007/0049314 A1* | 3/2007 | Balachandran et al. | 455/518 |
| 2009/0252084 A1* | 10/2009 | Fodor et al. | 370/328 |
| 2012/0128173 A1 | 5/2012 | Whikehart et al. | |

FOREIGN PATENT DOCUMENTS

| | | |
|---|---|---|
| KR | 20060122107 | 11/2006 |
| WO | 0030375 A2 | 5/2000 |
| WO | 2007011271 A1 | 1/2007 |

OTHER PUBLICATIONS

International Search Report and Written Opinion—PCT/US2013/065472—ISA/EPO—Mar. 19, 2014.

* cited by examiner

*Primary Examiner* — Frank Duong
(74) *Attorney, Agent, or Firm* — Raphael Freiwirth (57) ABSTRACT

The disclosure is directed to conducting group communications. An embodiment receives information defining a group communication from a first network, detects an availability of at least one local uni-directional radio broadcast network outside the first network, transmits an acknowledgment indicating an intention to connect to the at least one local uni-directional radio broadcast network, and monitors the group communication on the at least one local uni-directional radio broadcast network.

43 Claims, 8 Drawing Sheets

USING FM/AM RADIO AND CELLULAR TECHNOLOGY TO SUPPORT INTERACTIVE GROUP COMMUNICATION FOR LARGE NUMBER OF USERS

FIELD OF DISCLOSURE

The present disclosure relates generally to communication, and more specifically to techniques for supporting group communications on broadcast and multicast services in a cellular communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., a news broadcast. A multicast service is a service that may be received by a group of users, e.g., a subscription video service. A unicast service is a service intended for a specific user, e.g., a voice call. Group communications can be implemented using unicast, broadcast, multicast, or a combination of each.

The capacity of the unicast air interface is a limiting factor for interactive group communication for a large group of users in a mobile environment and/or in a small geographical region, such as a push-to-talk group call between a large number of users within a stadium. As the group becomes larger it is generally more efficient to use multicast services. Using multicast channels such as Broadcast and Multicast Service (BCMCS) or evolved Multimedia Broadcast Multicast Services (eMBMS) solves the problem of the limited air interface, but requires a very expensive infrastructure and core network, and as such, may not be a practical solution for most operators. In addition to the air interface limitation, the scalability of the group communication server is also a limiting factor for very large group call communication.

SUMMARY

The disclosure is directed to conducting group communications. An embodiment receives information defining a group communication from a first network, detects an availability of at least one local uni-directional radio broadcast network outside the first network, transmits an acknowledgment indicating an intention to connect to the at least one local uni-directional radio broadcast network, and monitors the group communication on the at least one local uni-directional radio broadcast network.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the various embodiments are disclosed in the following description and related drawings. Alternate embodiments may be devised without departing from the scope of the invention. Additionally, well-known elements of the various embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
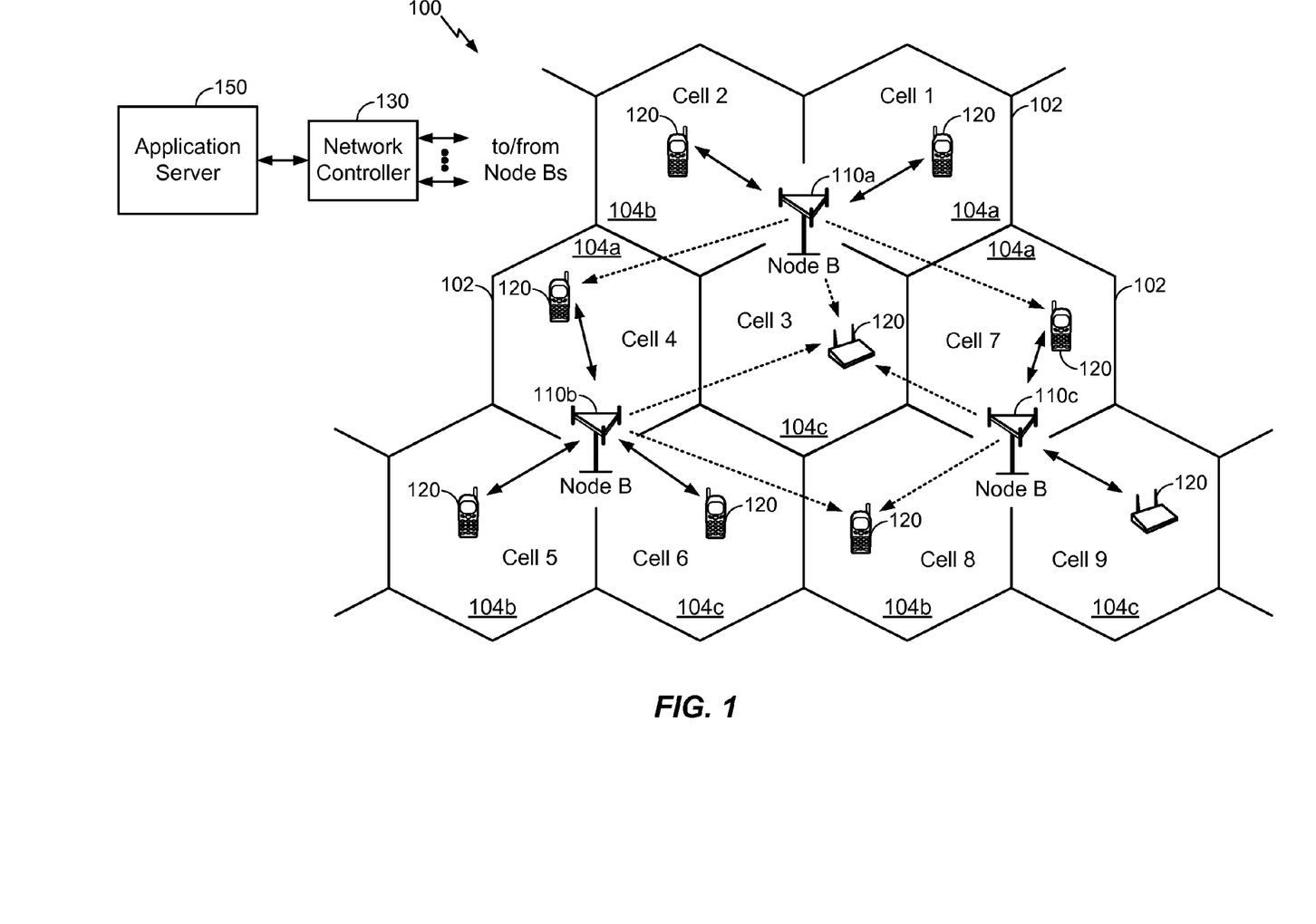
FIG. 1 illustrates a wireless communication system.

FIG. 1 shows a cellular communication system 100, which may be an LTE system. Cellular communication system 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110a-c (collectively Node B 110) provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Cellular communication system 100 may also include other network entities not shown in FIG. 1. Further, as illustrated network controller 130 may be operably coupled to an application server 150 to provide group communication services to the various UEs 120 through the cellular communication system 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

The system may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |

TABLE 2-continued

| Overhead Information | Channel | Description |
|---|---|---|
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:
- Content for broadcast or multicast services can be transmitted synchronously across multiple cells.
- Radio resources for broadcast and multicast services are allocated by an MBMS Coordinating Entity (MCE), which may be logically located above the Node Bs.
- Content for broadcast and multicast services is mapped on the MCH at a Node B.
- Time division multiplexing (e.g., at sub frame level) of data for broadcast, multicast, and unicast services.

The single-cell mode may have the following characteristics:
- Each cell transmits content for broadcast and multicast services without synchronization with other cells.
- Radio resources for broadcast and multicast services are allocated by the Node B.
- Content for broadcast and multicast services is mapped on the DL-SCH.
- Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

As noted above, eMBMS services can be used to distribute multicast data to groups and can be useful in group communication systems (e.g. push-to-talk (PTT) calls). Conventional applications on eMBMS have a separate service announcement/discovery mechanism. Further, communications on pre-established eMBMS flows are always on, even on the air interface. Power saving optimization must be applied to put the UE to sleep when a call/communication is not in progress. This is typically achieved by using out of band service announcements on unicast or multicast user plane data. Alternatively, an application layer paging channel mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

To achieve low latency and reduce control signaling, one eMBMS flow can be activated for each MBSFN. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Figure 2:
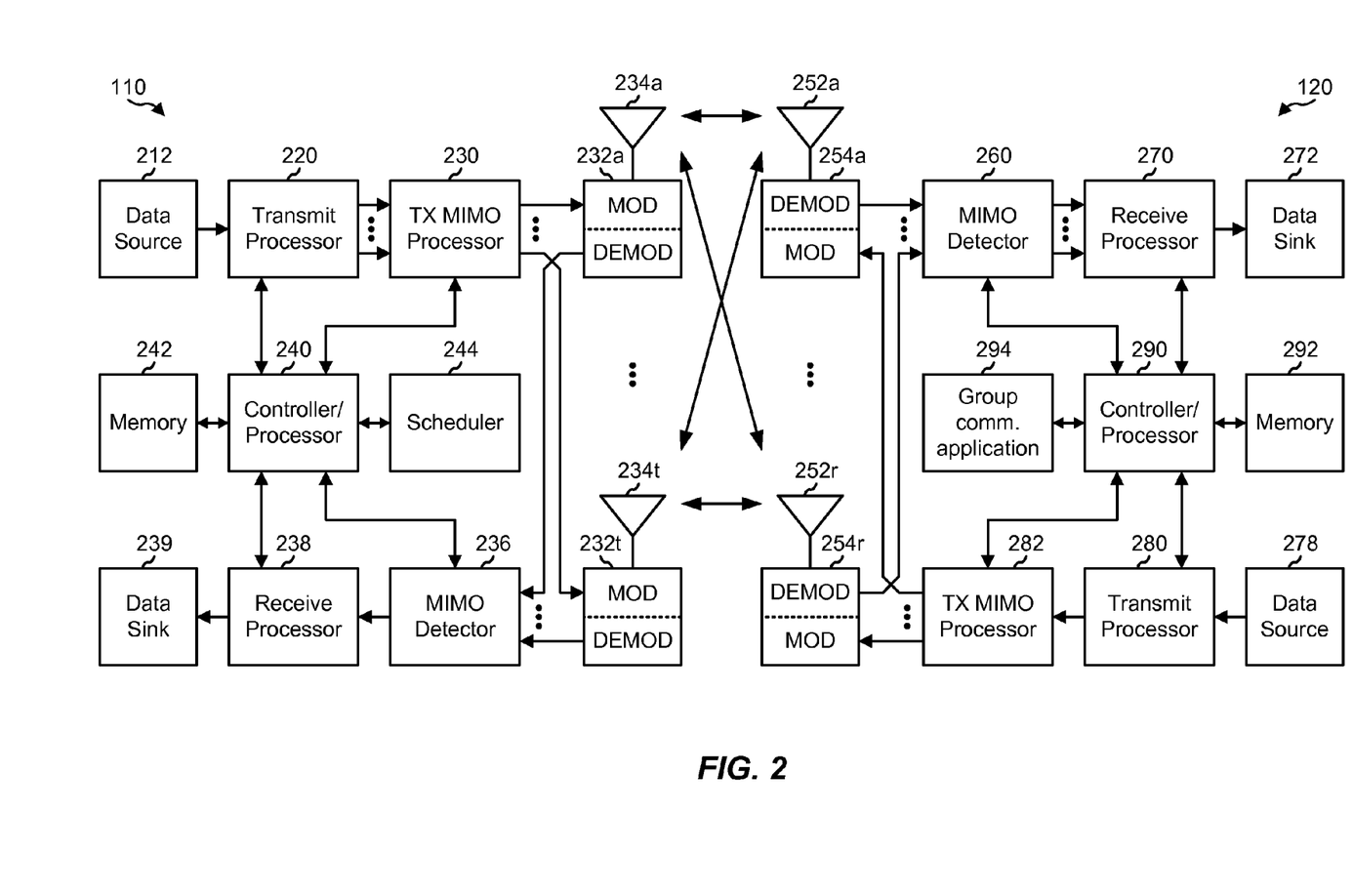
FIG. 2 illustrates a block diagram of a portion of a wireless communication system that can support broadcast/multicast services.

FIG. 2 illustrates a block diagram of a design of an eNode B 110 and UE 120, which may be one of the eNode Bs and one of the UEs discussed herein in relation to the various embodiments. In this design, eNode B 110 is equipped with T antennas 234a through 234t, and UE 120 is equipped with R antennas 252a through 252r, where in general T is greater than or equal to 1 and R is greater than or equal to 1.

At eNode B 110, a transmit processor 220 may receive data for unicast services and data for broadcast and/or multicast services from a data source 212 (e.g., directly or indirectly from application server 150). Transmit processor 220 may process the data for each service to obtain data symbols. Transmit processor 220 may also receive scheduling information, configuration information, control information, system information and/or other overhead information from a controller/processor 240 and/or a scheduler 244. Transmit processor 220 may process the received overhead information and provide overhead symbols. A transmit (TX) multiple-input multiple-output (MIMO) processor 230 may multiplex the data and overhead symbols with pilot symbols, process (e.g., precode) the multiplexed symbols, and provide T output symbol streams to T modulators (MOD) 232a through 232t. Each modulator 232a through 232t may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from eNode B 110 and provide received signals to demodulators (DEMOD) 254a through 254r, respectively. Each demodulator 254 may condition (e.g., filter, amplify, downconvert, and digitize) a respective received signal to obtain received samples and may further process the received samples (e.g., for OFDM) to obtain received symbols. A MIMO detector 260 may receive and process the received symbols from all R demodulators 254a through 254r and provide detected symbols. A receive processor 270 may process the detected symbols, provide decoded data for UE 120 and/or desired services to a data sink 272, and provide decoded overhead information to a controller/processor 290. In general, the processing by MIMO detector 260 and receive processor 270 is complementary to the processing by TX MIMO processor 230 and transmit processor 220 at eNode B 110.

On the uplink, at UE 120, data from a data source 278 and overhead information from a controller/processor 290 may be processed by a transmit processor 280, further processed by a TX MIMO processor 282 (if applicable), conditioned by demodulators 254a through 254r, and transmitted via antennas 252a through 252r. At eNode B 110, the uplink signals from UE 120 may be received by antennas 234, conditioned by modulators 232, detected by a MIMO detector 236, and processed by a receive processor 238 to obtain the data and overhead information transmitted by UE 120. A data source 239 is coupled to the receive processor 238.

Controllers/processors 240 and 290 may direct the operation at eNode B 110 and UE 120, respectively. Scheduler 244 may schedule UEs for downlink and/or uplink transmission, schedule transmission of broadcast and multicast services, and provide assignments of radio resources for the scheduled UEs and services. Controller/processor 240 and/or scheduler 244 may generate scheduling information and/or other overhead information for the broadcast and multicast services. Controller/processor 290 may implement processes for the techniques described herein. Memories 242 and 292 may store data and program codes for eNode B 110 and UE 120, respectively. In one embodiment, a group communication application 294 may operate in cooperation with the various processors and other components of the UE 120 to receive group communications over a local uni-directional radio broadcast network, such as an FM/AM channel. Accordingly, group communications in the eMBMS environment can be accomplished in accordance with the various embodiments disclosed herein, while still remaining compliant with the existing standards.

The capacity of the unicast air interface is a limiting factor for interactive group communication for a large group of users in a mobile environment and/or in a small geographical region. Using multicast channels such as BCMCS or eMBMS solves the problem of the limited air interface, but requires a very expensive infrastructure and core network, and as such, may not be a practical solution for many operators. In addition to the air interface limitation, the scalability of the group communication server is also a limiting factor for very large group call communication.

The various embodiments use a cell phone's FM/AM radio receiver to receive broadcast media for a large group call over FM/AM radio channels rather than the cellular network. In that way, enterprise customers can install less expensive FM/AM transmitters for their large group communications needs rather than depending on an expensive broadcast/multicast cellular network infrastructure.

The media to be broadcasted/multicasted is forwarded to a newly defined network element (analogous to a radio access network (RAN) or base transceiver station (BTS), or it could simply be another client) that will receive the media stream and broadcast it over a specific FM/AM radio frequency selected for the group. The operator may lease or buy the FM/AM channel. The location and signal strength of this FM/AM transmitter is such that it covers the local geographic area in which the large group is concentrated. For distributed large groups, there can be multiple FM/AM transmitters to cover each local cluster. Group members outside the range of the FM/AM transmitter can participate in the group call over a unicast channel.

The FM/AM channel can broadcast analog media or digital media. Analog voice over FM/AM raises security issues, since anyone tuning to that channel will be able to hear the broadcast. There are commercially available solutions for sending digital signals over FM/AM, however, which has the advantage of enabling security for the broadcast.

Using digital communication over FM/AM permits various forms of security mechanisms to be added to the group communication. Depending on the security requirements, listening on the FM/AM channel can be restricted or unrestricted. To restrict listening, the digital signaling can be encrypted. The server can provide the encryption key to a member device in, for example, the acknowledgement it sends to a member device in response to that member's call join message.

In addition, one FM/AM channel transmitting digital signals can support multiple groups by multiplexing the multiple group communications on the one FM/AM channel. Using more subcarriers, it might be possible to support more than two simultaneous groups. Supporting multiple groups using one FM/AM channel, however, depends on the capability of the FM/AM receiver on each member device.

Each group is defined with an assigned FM/AM channel, the address of the FM/AM transmitter, the group member list, and optionally, the start and end (or duration) times of when the group communication will be active. The group call can be setup for a specific time, as indicated by the start and end/duration times, or setup to begin immediately when a group member wishes to initiate a group call. Upon defining the group, each member device is notified with the group information. The call server or a group database server may use out-of-band signaling to communicate the group information to the group members. The out-of-band signaling may be, for example, a short message service (SMS) message. The member device can extract the group information from the SMS message, or the user can enter the information manually. The server can use a radio broadcast data system (RBDS) or FM digital signaling for call setup messages, such as call announcements, and in-call signaling.

During the time of the group call, each member device continuously monitors the FM/AM channel. The group call will be "always on" for the determined time duration. Based on the time trigger, the server will start the group call, as in a chat room. For example, for a group call among the employees at the headquarters of a large corporation, a group call may be defined for all employees from 9:00 AM to 10:00 AM every Monday. Accordingly, at 9:00 AM every Monday, the server will activate the group call and each member device will tune to the FM/AM channel.

When activating the group call, the server activates the interface between itself and the FM/AM transmitter. When a member wishes to speak, he or she sends a Floor Request to the server over a unicast channel. The server controls the floor, and forwards the media to the FM/AM transmitter. The FM/AM transmitter broadcasts the media on the FM/AM channel. All the members will be able to hear if any group member speaks on the channel.

In an embodiment, members can optionally send a join message to the server over a unicast radio channel. In this way, the server can track how many members join the call and periodically send a status message (e.g. as an SMS message) to all of the group members indicating how many members have joined the call. Members outside of the FM/AM coverage area can join the call over a unicast channel.

Figure 3:
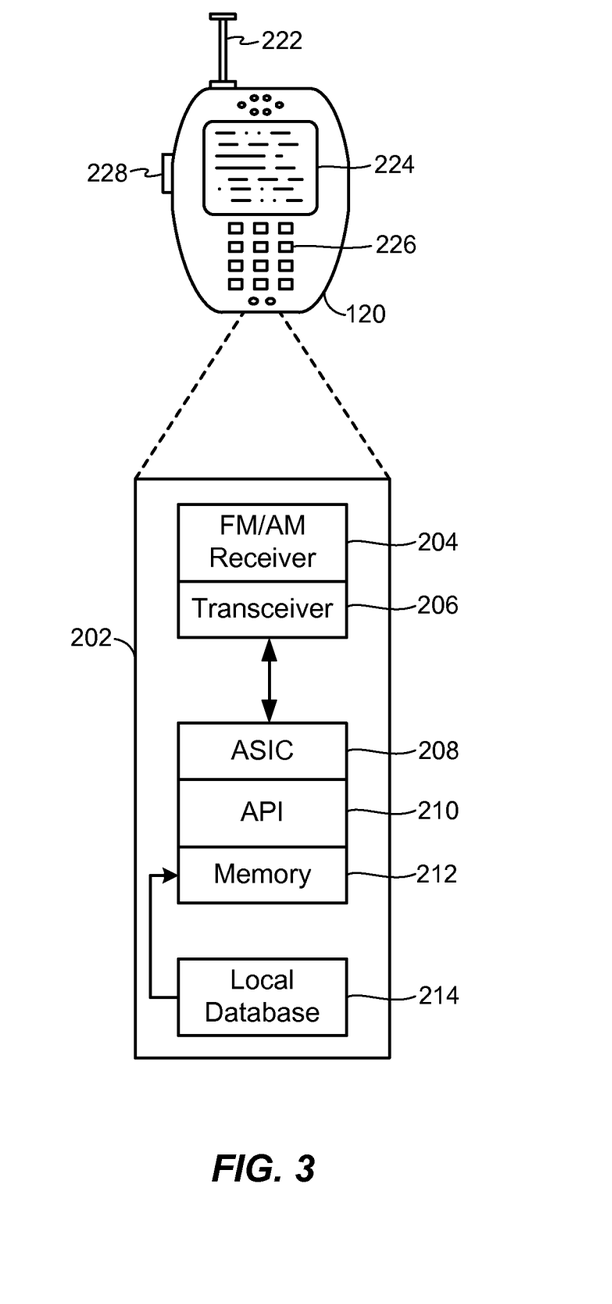
FIG. 3 illustrates a user equipment (UE).

Referring to FIG. 3, a UE 120, (here a wireless device), such as a cellular telephone, has a platform 202 that can receive and execute software applications, data and/or commands transmitted from the RAN that may ultimately come from the core network, the Internet and/or other remote servers and networks. The platform 202 can include an FM/AM receiver 204 and a transceiver 206 operably coupled to an ASIC 208, or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only memory (ROM), random-access memory (RAM), electrically erasable programmable (EEPROM), flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of UE 120 in FIG. 3 are merely illustrative and the invention is not limited to the illustrated features or arrangement.

Figure 4:
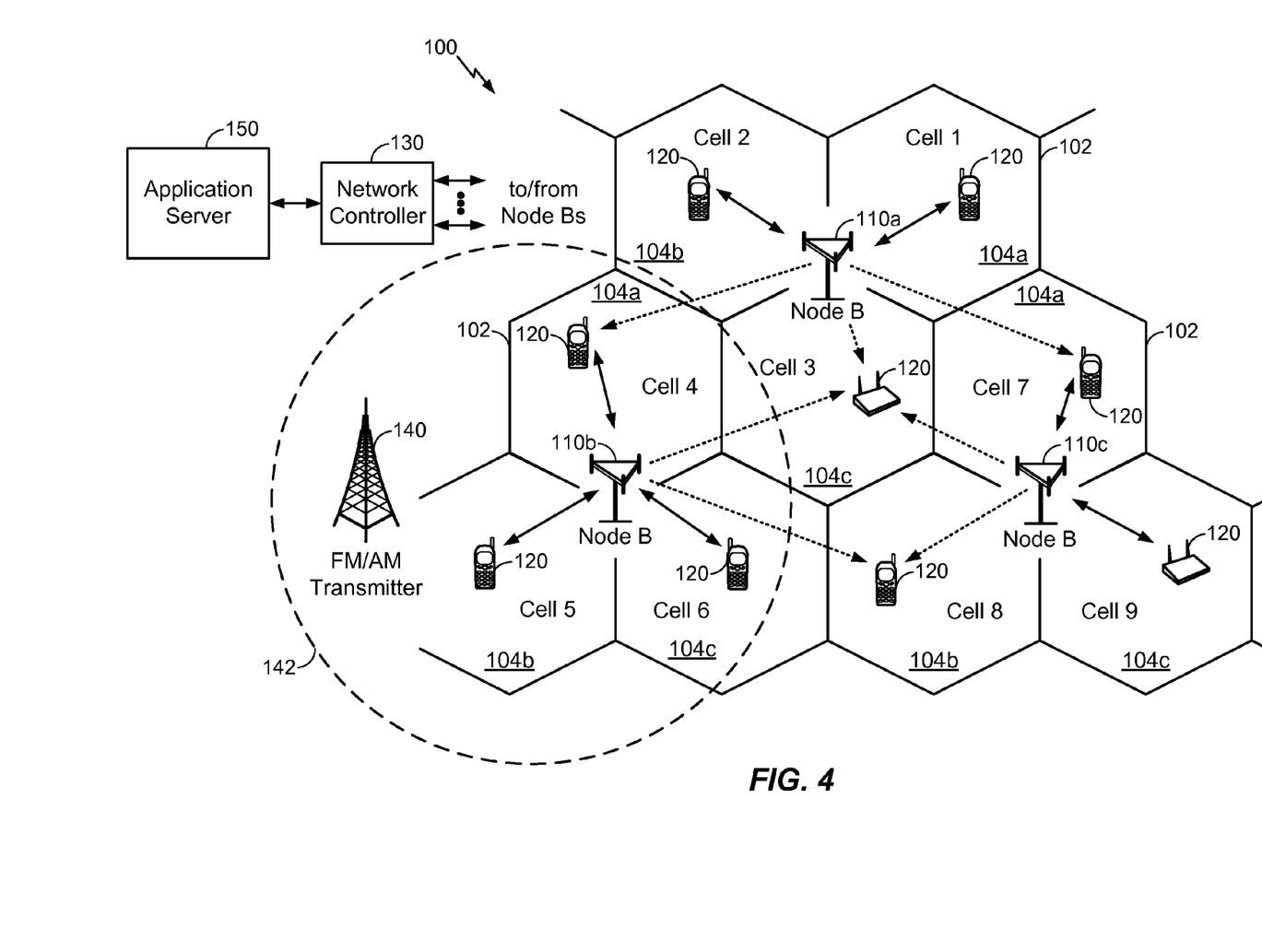
FIG. 4 illustrates an exemplary wireless communication system.

FIG. 4 illustrates cellular communication system 100, discussed above with reference to FIG. 1, with an FM/AM transmitter 140 receiving communications from application server 150. FM/AM transmitter 140 has a coverage area 142, shown as overlapping the service area of Node B 110b. It is apparent that the coverage area 142 covers an arbitrary geographic area based on terrain, atmospheric conditions, transmitter power, elevation of the transmitter, etc. Accordingly, the coverage area 142 may cover more or less of the service area of the Node B 110b than is shown. The FM/AM transmitter 140 transmits group communication media received from the application server 150 to UEs 120 in the coverage area 142.

Figure 5:
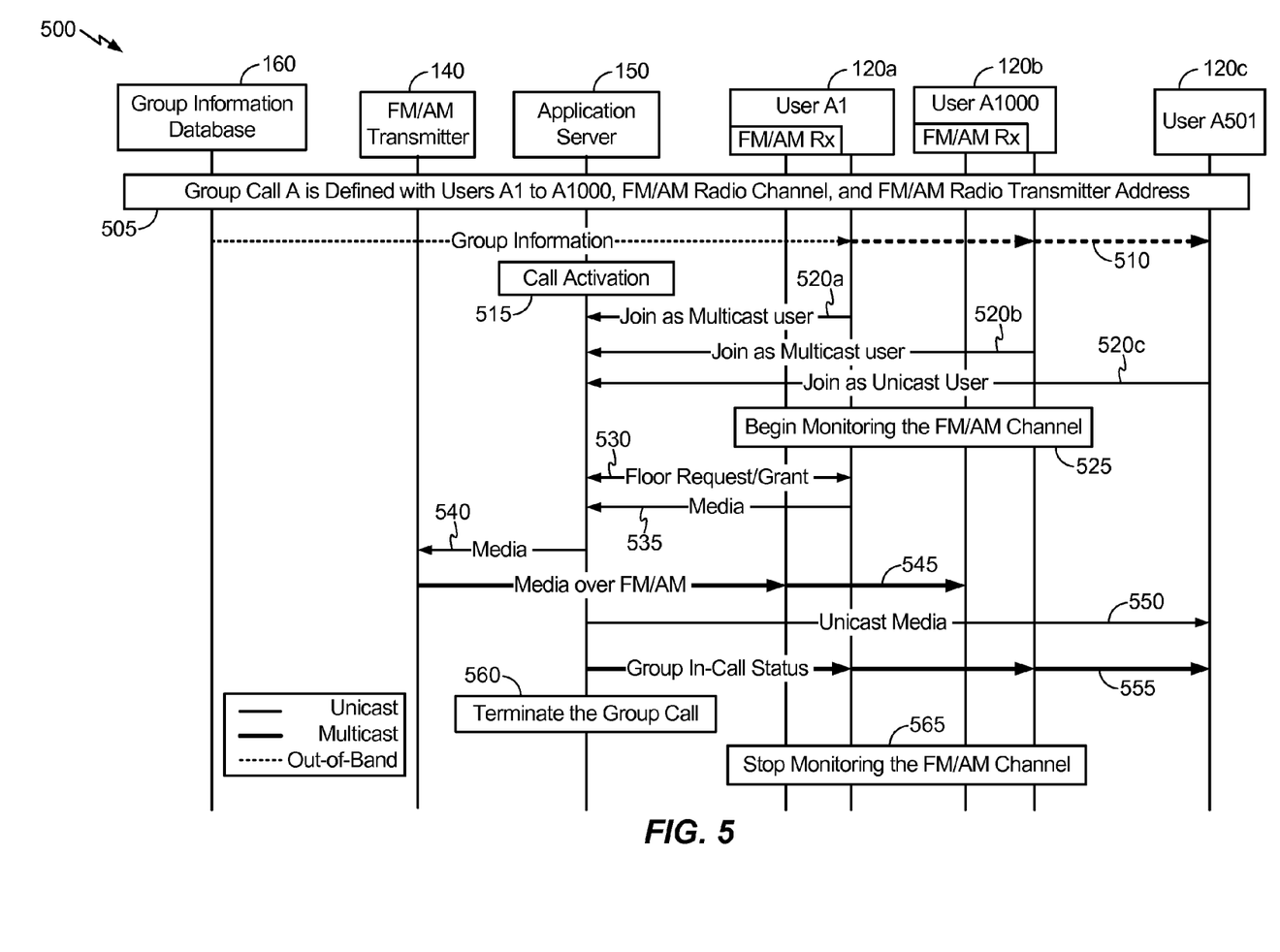
FIG. 5 illustrates an exemplary flow of an embodiment.

FIG. 5 illustrates an exemplary flow 500 of an embodiment. At 505, a large group call, such as a PTT call, is defined with users A1 to A1000, the assigned FM/AM channel, the address of the FM/AM transmitter, and optionally, the start and end (or duration) times of when the group communication will be active. This information can be defined at an administrator portal for the group call.

At 510, a group information database server 160 transmits this group information to each member of the group using out-of-band signaling, such as an SMS message. The group information database server 160 may be the application server 150 or a separate entity in communication with the application server 150. The group information database server 160 does not need to use the FM/AM channel to send the group information to the group members, although it can.

At 515, the application server 150 activates the group call at the start time. Call activation does not require the application server 150 to explicitly send signaling to the group members, although it can. For example, the application server 150 can optionally send an out-of-band (e.g. SMS) or broadcasted call announcement to the group members. Rather, to activate the group call, the application server 150 starts the call and activates the interface between the application server 150 and the FM/AM transmitter 140. From that time, if any member tunes to the FM/AM frequency, that member will be able to hear the group call and send floor request messages over a unicast channel.

The application server 150 can start the call based on the pre-configured start time, or any other trigger. For example, the application server 150 may start the call based on an out-of-band communication from an administrator portal.

At 520a, user A1 120a transmits an acknowledgment to the application server 150 indicating that it is joining the group call as a multicast user. At 520b, user A1000 120b transmits an acknowledgment to the application server 150 indicating that it is joining the group call as a multicast user. At 520c, user A501 120c transmits an acknowledgment to the application server 150 indicating that it is joining the group call as a unicast user. User A501 120c may join the call as a unicast user because user A501 120c is outside the FM/AM coverage area or the UE does not have an FM/AM receiver. The acknowledgments are transmitted on a unicast channel. At 525, each multicast member device begins monitoring the FM/AM channel.

For ease of illustration, FIG. 5 only shows exemplary users A1 120a, A1000 120b, and A501 120c. As is apparent, however, any number of group members A1 to A1000 may be multicast or unicast users and/or have or not have FM/AM receivers.

At 530, user A1 120a requests and is granted the floor. User A1 120a transmits the floor request to the application server 150 on a unicast channel. Likewise, the application server 150 transmits the floor grant to user A1 120a on a unicast channel. At 535, user A1 120a transmits media, such as a talk spurt, to the application server 150 on the unicast channel.

At 540, the application server 150 transmits the media to the address (e.g. an Internet protocol (IP) address) of the FM/AM transmitter 140. The application server 150 treats the FM/AM transmitter 140 as a group member, and sends the media to the FM/AM transmitter 140 for all the group members except the unicast members, such as user A501 120c.

At 545, the FM/AM transmitter 140 broadcasts the media on the FM/AM channel. The media can be sent in analog format (providing no security) or as digital media over FM/AM (permitting security). At 550, the application server 150 transmits the media to the unicast users, such as user A501 120c, over a unicast channel.

At 555, the application server 150 broadcasts the group in-call status to each group member. This information can also be transmitted as an SMS message. At 560, the application server 150 terminates the group call at the designated time, after the designated duration, at the instruction of the call originator, or at the instruction of the group moderator. At 565, the multicast group members stop monitoring the FM/AM channel.

Figure 6:
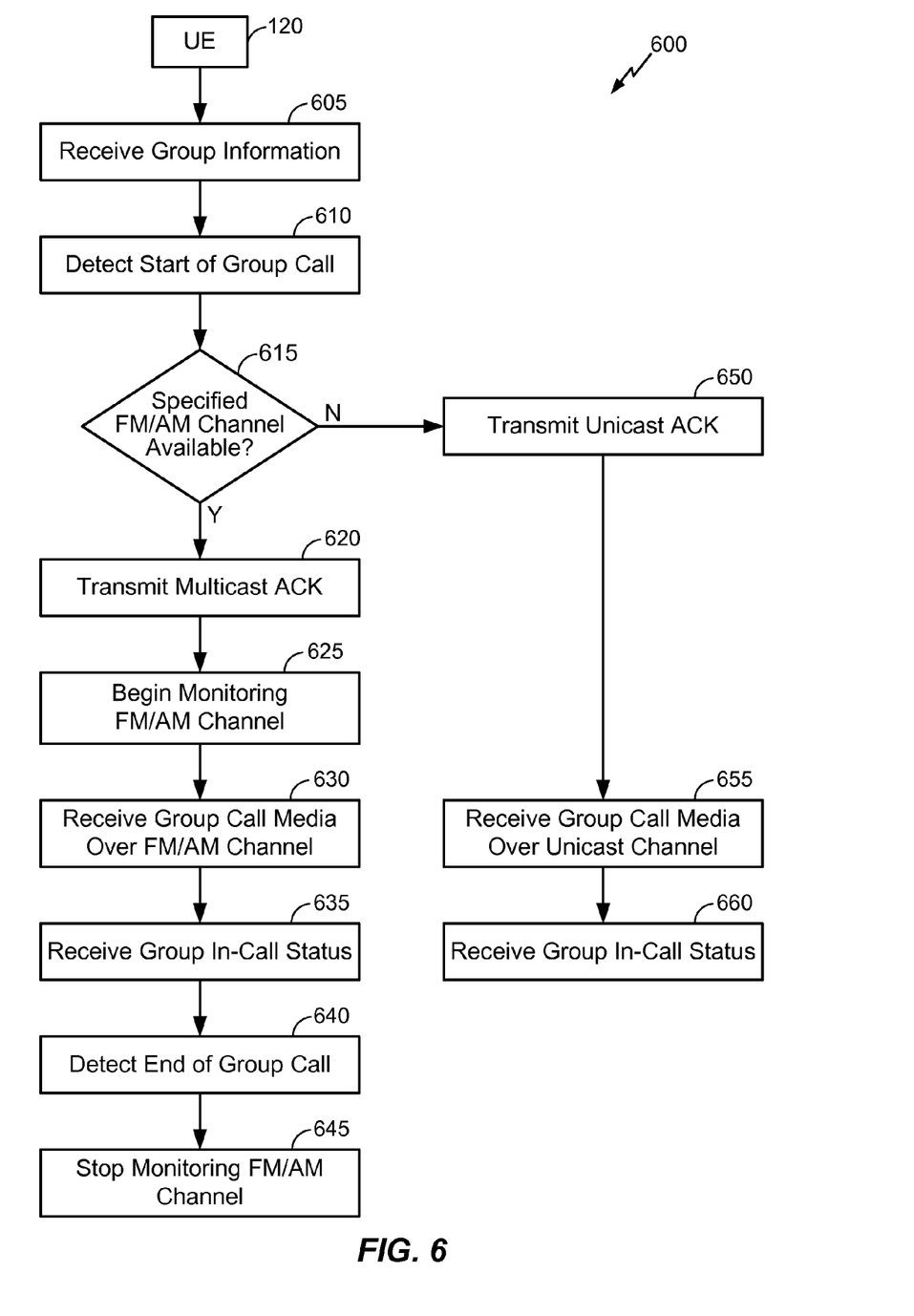
FIG. 6 illustrates an exemplary flow of an embodiment performed at a UE.

FIG. 6 illustrates an exemplary flow 600 of an embodiment performed at UE 120. At 605, UE 120 receives group information from the group information database server 160. The information can specify the group members, the assigned FM/AM channel, the address of the FM/AM transmitter, and the start and end (or duration) times of when the group communication will be active. At 610, UE 120 detects that the group communication is starting. This may be based on the UE 120 detecting that the start time of the group communication has arrived or receiving a call announcement from the application server 150 indicating that a group communication will be broadcast over the FM/AM channel specified in the group information received at 605.

At 615, UE 120 determines whether the specified FM/AM channel is available. This may include a determination of whether UE 120 has an FM/AM receiver and/or whether the FM/AM receiver can receive the specified FM/AM channel. UE 120 may not be able to receive the FM/AM channel if, for example, UE 120 is outside the coverage area of the FM/AM channel.

If the specified FM/AM channel is available, then at 620, UE 120 transmits an acknowledgment to the application server 150 indicating that it will be a multicast member of the group communication. At 625, UE 120 begins monitoring the FM/AM channel. At 630, UE 120 receives group communication media, such as a talk spurt, over the FM/AM channel.

At 635, UE 120 receives a group in-call status from the application server 150. At 640, UE 120 detects the end of the group communication. This may be based on an explicit message from the application server 150 or the detection of the call end time or the expiration of the specified call duration time. At 645, UE 120 stops monitoring the FM/AM channel.

If the specified FM/AM channel is not available, then at 650, UE 120 transmits an acknowledgment indicating that it will be a unicast member of the group communication. At 655, UE 120 receives group communication media, such as a talk spurt, over the unicast channel. At 660, UE 120 receives a group in-call status from the application server 150.

Figure 7:
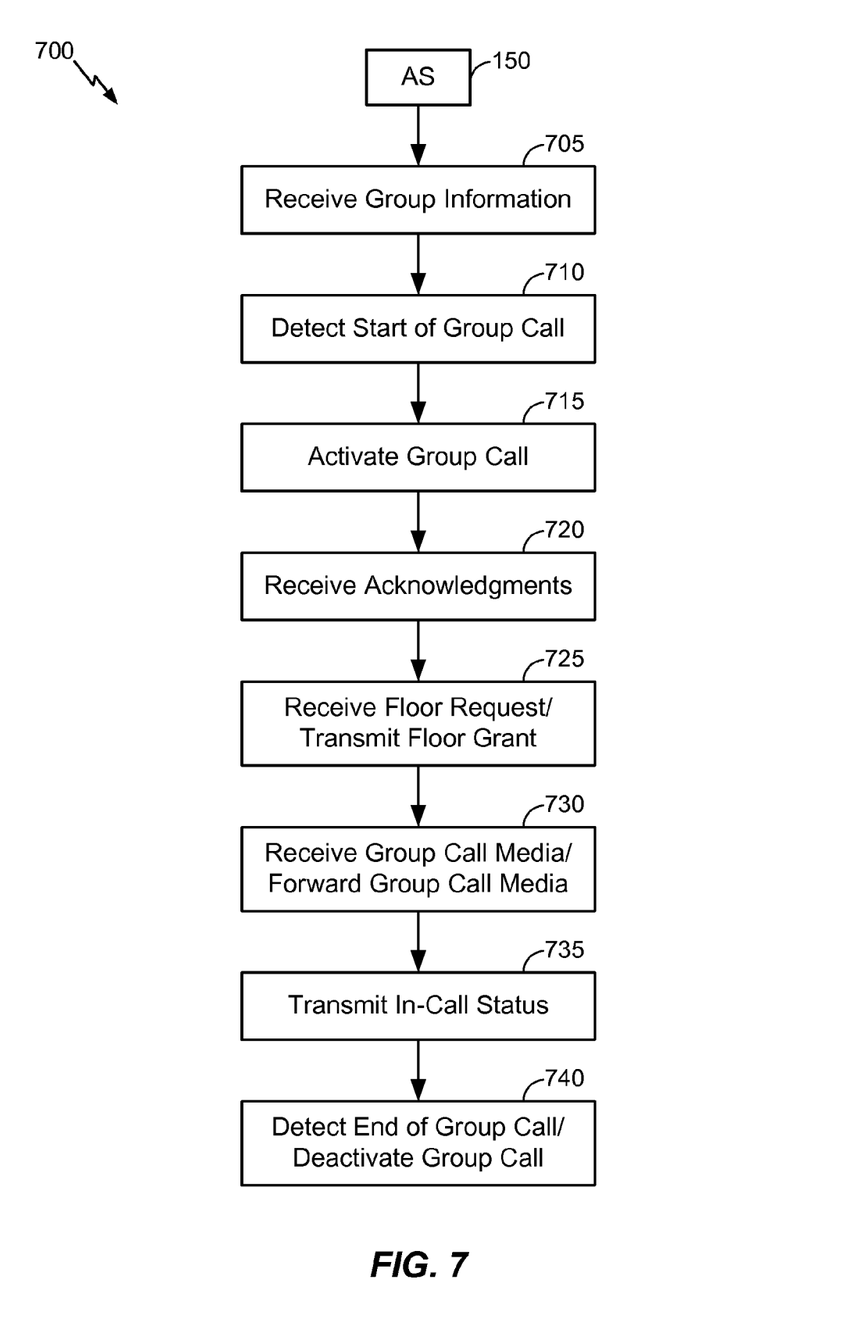
FIG. 7 illustrates an exemplary flow of an embodiment performed at an application server.

FIG. 7 illustrates an exemplary flow 700 of an embodiment performed at the application server 150. At 705, the application server 150 receives group information for the communications group. The application server 150 may receive this information from the group information database server 160 or a group call originator or moderator. At 710, the application server 150 detects that the group call should begin based on the group information. At 715, the application server 150 activates the group call by activating the interface between the application server 150 and the FM/AM transmitter 140. At 720, the application server 150 receives acknowledgments from the group members indicating whether or not they will be monitoring the FM/AM channel for group communications.

At 725, the application server 150 receives a floor request from a group member and transmits a floor grant to the member. At 730, the application server 150 receives group communication media from the member, such as a talk spurt, and forwards it to the FM/AM transmitter 140 and the unicast group members, as appropriate, based on the received acknowledgments.

At 735, the application server 150 transmits an in-call status to the group members. At 740, the application server 150 detects the end of the group communication and deactivates it.

Figure 8:
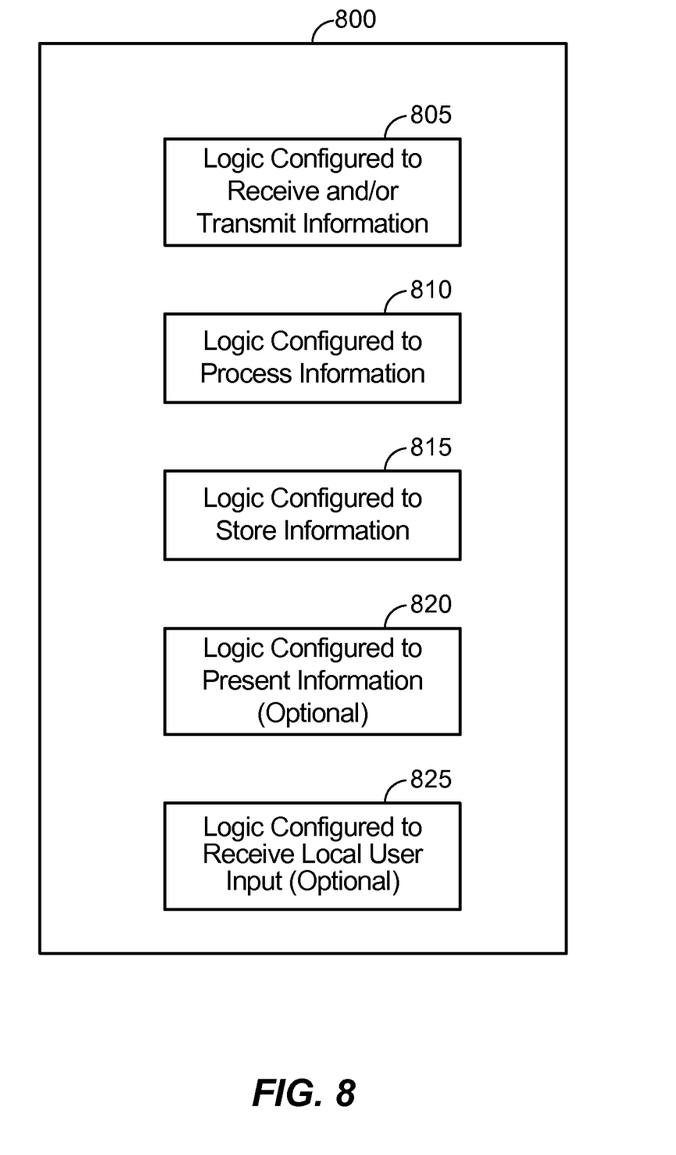
FIG. 8 illustrates a communication device that includes logic configured to perform functionality.

FIG. 8 illustrates a communication device 800 that includes logic configured to perform functionality. The communication device 800 can correspond to any of the above-noted communication devices, including but not limited to UEs 120, Node Bs or base stations 110, the FM/AM transmitter 140, a packet data network end-point, any of the servers 150 and 160, etc. Thus, communication device 800 can correspond to any electronic device that is configured to communicate with (or facilitate communication with) one or more other entities over a network.

Referring to FIG. 8, the communication device 800 includes logic configured to receive and/or transmit information 805. In an example, if the communication device 800 corresponds to a wireless communications device (e.g., UE 120, eNode B 110, FM/AM transmitter 140, etc.), the logic configured to receive and/or transmit information 805 can include a wireless communications interface (e.g., Bluetooth, WiFi, 2G, 3G, FM, AM, etc.) such as a wireless transceiver and associated hardware (e.g., an RF antenna, a MODEM, a modulator and/or demodulator, etc.). In another example, the logic configured to receive and/or transmit information 805 can correspond to a wired communications interface (e.g., a serial connection, a USB or Firewire connection, an Ethernet connection through which the Internet can be accessed, etc.). Thus, if the communication device 800 corresponds to some type of network-based server (e.g., application server 150, etc.), the logic configured to receive and/or transmit information 805 can correspond to an Ethernet card, in an example, that connects the network-based server to other communication entities via an Ethernet protocol. In a further example, the logic configured to receive and/or transmit information 805 can include sensory or measurement hardware by which the communication device 800 can monitor its local environment (e.g., an accelerometer, a temperature sensor, a light sensor, an antenna for monitoring local RF signals, etc.). The logic configured to receive and/or transmit information 805 can also include software that, when executed, permits the associated hardware of the logic configured to receive and/or transmit information 805 to perform its reception and/or transmission function(s). However, the logic configured to receive and/or transmit information 805 does not correspond to software alone, and the logic configured to receive and/or transmit information 805 relies at least in part upon hardware to achieve its functionality.

Referring to FIG. 8, the communication device 800 further includes logic configured to process information 810. In an example, the logic configured to process information 810 can include at least a processor. Example implementations of the type of processing that can be performed by the logic configured to process information 810 includes but is not limited to performing determinations, establishing connections, making selections between different information options, performing evaluations related to data, interacting with sensors coupled to the communication device 800 to perform measurement operations, converting information from one format to another (e.g., between different protocols such as .wmv to .avi, etc.), and so on. For example, the processor included in the logic configured to process information 810 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 810 can also include software that, when executed, permits the associated hardware of the logic configured to process information 810 to perform its processing function(s). However, the logic configured to process information 810 does not correspond to software alone, and the logic configured to process information 810 relies at least in part upon hardware to achieve its functionality.

Referring to FIG. 8, the communication device 800 further includes logic configured to store information 815. In an example, the logic configured to store information 815 can include at least a non-transitory memory and associated hardware (e.g., a memory controller, etc.). For example, the non-transitory memory included in the logic configured to store information 815 can correspond to RAM memory, flash memory, ROM memory, EPROM memory, EEPROM memory, registers, hard disk, a removable disk, a CD-ROM, or any other form of storage medium known in the art. The logic configured to store information 815 can also include software that, when executed, permits the associated hardware of the logic configured to store information 815 to perform its storage function(s). However, the logic configured to store information 815 does not correspond to software alone, and the logic configured to store information 815 relies at least in part upon hardware to achieve its functionality.

Referring to FIG. 8, the communication device 800 further optionally includes logic configured to present information 820. In an example, the logic configured to present information 820 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 800. For example, if the communication device 800 corresponds to UE 120 as shown in FIG. 3, the logic configured to present information 820 can include the display 224. In a further example, the logic configured to present information 820 can be omitted for certain communication devices, such as network communication devices that do not have a local user (e.g., network switches or routers, remote servers, etc.). The logic configured to present information 820 can also include software that, when executed, permits the associated hardware of the logic configured to present information 820 to perform its presentation function(s). However, the logic configured to present information 820 does not correspond to software alone, and the logic configured to present information 820 relies at least in part upon hardware to achieve its functionality.

Referring to FIG. 8, the communication device 800 further optionally includes logic configured to receive local user input 825. In an example, the logic configured to receive local user input 825 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 800. For example, if the communication device 800 corresponds to UE 120 as shown in FIG. 3, the logic configured to receive local user input 825 can include the display 224 (if implemented a touch-screen), keypad 226, etc. In a further example, the logic configured to receive local user input 825 can be omitted for certain communication devices, such as network communication devices that do not have a local user (e.g., network switches or routers, remote servers, etc.). The logic configured to receive local user input 825 can also include software that, when executed, permits the associated hardware of the logic configured to receive local user input 825 to perform its input reception function(s). However, the logic configured to receive local user input 825 does not correspond to software alone, and the logic configured to receive local user input 825 relies at least in part upon hardware to achieve its functionality.

Referring to FIG. 8, while the configured logics of 805 through 825 are shown as separate or distinct blocks in FIG. 8, it will be appreciated that the hardware and/or software by which the respective configured logic performs its functionality can overlap in part. For example, any software used to facilitate the functionality of the configured logics of 805 through 825 can be stored in the non-transitory memory associated with the logic configured to store information 815, such that the configured logics of 805 through 825 each performs their functionality (i.e., in this case, software execution) based in part upon the operation of software stored by the logic configured to store information 805. Likewise, hardware that is directly associated with one of the configured logics can be borrowed or used by other configured logics from time to time. For example, the processor of the logic configured to process information 810 can format data into an appropriate format before being transmitted by the logic configured to receive and/or transmit information 805, such that the logic configured to receive and/or transmit information 805 performs its functionality (i.e., in this case, transmission of data) based in part upon the operation of hardware (i.e., the processor) associated with the logic configured to process information 810.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for conducting group communications. Accordingly, the invention is not limited to illustrated examples and any means for performing the functionality described herein are included in the various embodiments.

While the foregoing disclosure shows illustrative embodiments, it should be noted that various changes and modifications could be made herein without departing from the scope of the invention as defined by the appended claims. The functions, steps and/or actions of the method claims in accordance with the various embodiments described herein need not be performed in any particular order. Furthermore, although elements of the various embodiments may be described or claimed in the singular, the plural is contemplated unless limitation to the singular is explicitly stated.

What is claimed is:

1. A method for conducting group communications, comprising:
   receiving, at a user equipment (UE), information defining a group communication from a first network;
   detecting, at the UE, an availability of at least one local uni-directional radio broadcast network outside the first network, wherein detecting the availability of the at least one local uni-directional radio broadcast network comprises determining whether the UE has a receiver capable of receiving transmissions over the at least one local uni-directional radio broadcast network;
   based on the receiver of the UE being capable of receiving transmissions over the at least one local uni-directional radio broadcast network, transmitting an acknowledgment indicating an intention to connect to the at least one local uni-directional radio broadcast network and monitoring the group communication on the at least one local uni-directional radio broadcast network; and
   based on the receiver of the UE not being capable of receiving transmissions over the at least one local uni-directional radio broadcast network, receiving the group communication over a unicast channel.

2. The method of claim 1, wherein the at least one local uni-directional radio broadcast network is an FM or AM transmission.

3. The method of claim 2, wherein the first network is a cellular network.

4. The method of claim 2, wherein the transmitting the acknowledgment is performed on the first network.

5. The method of claim 4, wherein the first network is a cellular network and the transmitting is performed on a unicast connection.

6. The method of claim 2, wherein the FM or AM transmission is an analog transmission.

7. The method of claim 2, wherein the FM transmission is a Digital Media over FM transmission.

8. The method of claim 7, wherein the Digital Media over FM transmission is a secure connection and authentication is required to join the group communication.

9. The method of claim 1, wherein the first network is a cellular network, the method further comprising:
   establishing a unicast connection on the first network to allow communication in the group communication.

10. The method of claim 9, wherein the establishing is a floor request and the group communication is a push-to-talk (PTT) group communication.

11. The method of claim 9, further comprising:
    dropping the unicast connection on the first network after the communication in the group communication.

12. The method of claim 1, wherein the information defining the group communication comprises an identifier and/or an address of the at least one local uni-directional radio broadcast network.

13. The method of claim 1, wherein the information defining the group communication comprises a group member list.

14. The method of claim 1, wherein the information defining the group communication comprises a start time and an end time or a duration of the group communication.

15. The method of claim 1, further comprising:
    detecting a start time of the group communication based on the information defining the group communication.

16. The method of claim 1, further comprising:
    detecting an end time of the group communication based on the information defining the group communication; and
    ceasing to monitor the at least one local uni-directional radio broadcast network.

17. The method of claim 1, further comprising:
    receiving a group communication media over the at least one local uni-directional radio broadcast network.

18. The method of claim 17, wherein the group communication media is a talk spurt.

19. The method of claim 1, further comprising:
    receiving an in-call status on the first network.

20. The method of claim 1, wherein the receiving comprises:
    receiving the information defining the group communication in a short message service (SMS) message.

21. An apparatus for conducting group communications, comprising:
    a processor; and
    a memory storing instructions that, when executed by the processor, cause the apparatus to perform operations comprising:
       receiving information defining a group communication from a first network;
       detecting an availability of at least one local uni-directional radio broadcast network outside the first network, wherein detecting the availability of the at least one local uni-directional radio broadcast network comprises determining whether the apparatus has a receiver capable of receiving transmissions over the at least one local uni-directional radio broadcast network;
       based on the receiver of the apparatus being capable of receiving transmissions over the at least one local uni-directional radio broadcast network, transmitting an acknowledgment indicating an intention to connect to the at least one local uni-directional radio broadcast network and monitoring the group communication on the at least one local uni-directional radio broadcast network; and
       based on the receiver of the apparatus not being capable of receiving transmissions over the at least one local uni-directional radio broadcast network, receiving the group communication over a unicast channel.

22. The apparatus of claim 21, wherein the at least one local uni-directional radio broadcast network is an FM or AM transmission.

23. The apparatus of claim 22, wherein the first network is a cellular network.

24. The apparatus of claim 22, wherein the transmitting the acknowledgment is performed on the first network.

25. The apparatus of claim 24, wherein the first network is a cellular network and the transmitting is performed on a unicast connection.

26. The apparatus of claim 22, wherein the FM or AM transmission is an analog transmission.

27. The apparatus of claim 22, wherein the FM transmission is a Digital Media over FM transmission.

28. The apparatus of claim 27, wherein the Digital Media over FM transmission is a secure connection and authentication is required to join the group communication.

29. The apparatus of claim 21, wherein the first network is a cellular network, the operations further comprising:
    establishing a unicast connection on the first network to allow communication in the group communication.

30. The apparatus of claim 29, wherein the establishing is a floor request and the group communication is a push-to-talk (PTT) group communication.

31. The apparatus of claim 29, wherein the operations further comprise:
   dropping the unicast connection on the first network after the communication in the group communication.

32. The apparatus of claim 21, wherein the information defining the group communication comprises an identifier and/or an address of the at least one local uni-directional radio broadcast network.

33. The apparatus of claim 21, wherein the information defining the group communication comprises a group member list.

34. The apparatus of claim 21, wherein the information defining the group communication comprises a start time and an end time or a duration of the group communication.

35. The apparatus of claim 21, wherein the operations further comprise:
   detecting a start time of the group communication based on the information defining the group communication.

36. The apparatus of claim 21, wherein the operations further comprise:
   detecting an end time of the group communication based on the information defining the group communication; and
   ceasing to monitor the at least one local uni-directional radio broadcast network.

37. The apparatus of claim 21, wherein the operations further comprise:
   receiving a group communication media over the at least one local uni-directional radio broadcast network.

38. The apparatus of claim 37, wherein the group communication media is a talk spurt.

39. The apparatus of claim 21, wherein the operations further comprise:
   receiving an in-call status on the first network.

40. The apparatus of claim 21, wherein the receiving comprises:
   receiving the information defining the group communication in a short message service (SMS) message.

41. An apparatus for conducting group communications, comprising:
   logic configured to receive information defining a group communication from a first network;
   logic configured to detect an availability of at least one local uni-directional radio broadcast network outside the first network, wherein the logic configured to detect the availability of the at least one local uni-directional radio broadcast network comprises logic configured to determine whether the apparatus has a receiver capable of receiving transmissions over the at least one local uni-directional radio broadcast network;
   logic configured to transmit, based on based on the receiver of the apparatus being capable of receiving transmissions over the at least one local uni-directional radio broadcast network, an acknowledgment indicating an intention to connect to the at least one local uni-directional radio broadcast network and to monitor the group communication on the at least one local uni-directional radio broadcast network; and
   logic configured to receive the group communication over a unicast channel based on the receiver of the apparatus not being capable of receiving transmissions over the at least one local uni-directional radio broadcast network.

42. An apparatus for conducting group communications, comprising:
   means for receiving information defining a group communication from a first network;
   means for detecting an availability of at least one local uni-directional radio broadcast network outside the first network, wherein the means for detecting the availability of the at least one local uni-directional radio broadcast network comprises means for determining whether the apparatus has a receiver capable of receiving transmissions over the at least one local uni-directional radio broadcast network;
   means for transmitting, based on the receiver of the apparatus being capable of receiving transmissions over the at least one local uni-directional radio broadcast network, an acknowledgment indicating an intention to connect to the at least one local uni-directional radio broadcast network and for monitoring the group communication on the at least one local uni-directional radio broadcast network; and
   means for receiving the group communication over a unicast channel based on the receiver of the apparatus not being capable of receiving transmissions over the at least one local uni-directional radio broadcast network.

43. A non-transitory computer-readable medium for conducting group communications, comprising:
   at least one instruction to receive information defining a group communication from a first network;
   at least one instruction to detect an availability of at least one local uni-directional radio broadcast network outside the first network, wherein the at least one instruction to detect the availability of the at least one local uni-directional radio broadcast network comprises at least one instruction to determine whether a user equipment (UE) has a receiver capable of receiving transmissions over the at least one local uni-directional radio broadcast network;
   at least one instruction to transmit, based on the receiver of the UE being capable of receiving transmissions over the at least one local uni-directional radio broadcast network, an acknowledgment indicating an intention to connect to the at least one local uni-directional radio broadcast network and to monitor the group communication on the at least one local uni-directional radio broadcast network; and
   at least one instruction to receive the group communication over a unicast channel based on the receiver of the UE not being capable of receiving transmissions over the at least one local uni-directional radio broadcast network.

* * * * *